United States Patent [19]

Kaufman

[11] 4,116,563
[45] Sep. 26, 1978

[54] PATTERN REPRODUCTION TABLE

[76] Inventor: William Kaufman, 4 Stonehurst Ct., Pomona, N.Y. 10970

[21] Appl. No.: 830,020

[22] Filed: Sep. 2, 1977

Related U.S. Application Data

[63] Continuation-in-part of Ser. No. 660,829, Feb. 24, 1976, abandoned.

[51] Int. Cl.² ...................... A47B 13/00; G03B 27/20
[52] U.S. Cl. ......................................... 355/91; 108/23; 355/73;76;91;94
[58] Field of Search ............................... 108/23; 52/16

[56] References Cited

U.S. PATENT DOCUMENTS

| | | | |
|---|---|---|---|
| 1,113,263 | 10/1914 | Ulrich | 108/23 |
| 1,147,196 | 7/1915 | Sweigard | 355/76 |
| 1,801,432 | 4/1931 | Johnson | 108/23 |
| 2,695,430 | 11/1954 | Wakefield | 240/78 LD X |
| 2,783,016 | 2/1957 | Limberger | 355/76 UX |
| 3,064,525 | 11/1962 | Lemche | 355/76 |
| 3,188,909 | 6/1965 | Wally et al. | 355/76 |
| 3,446,162 | 5/1969 | Kranz | 108/23 |
| 3,512,487 | 5/1970 | Kranz et al. | 108/23 |
| 3,851,969 | 12/1974 | Haus | 108/23 X |

FOREIGN PATENT DOCUMENTS

| | | | |
|---|---|---|---|
| 680,735 | 2/1964 | Canada | 355/73 |
| 1,228,924 | 11/1966 | Fed. Rep. of Germany | 355/94 |

Primary Examiner—Donald A. Griffin
Attorney, Agent, or Firm—Edward F. Levy

[57] ABSTRACT

A pattern reproduction table incorporates a support grid which supports a transparent perforated sheet above a plurality of lamps. The support grid comprises a plurality of thin polished longitudinal and transverse members which are interlocked and which are mounted in tension on an enclosure. The support grid provides rigid support for the transparent perforated sheet without obscuring the lamps or interfering with a vacuum blower which is mounted in the enclosure.

14 Claims, 11 Drawing Figures

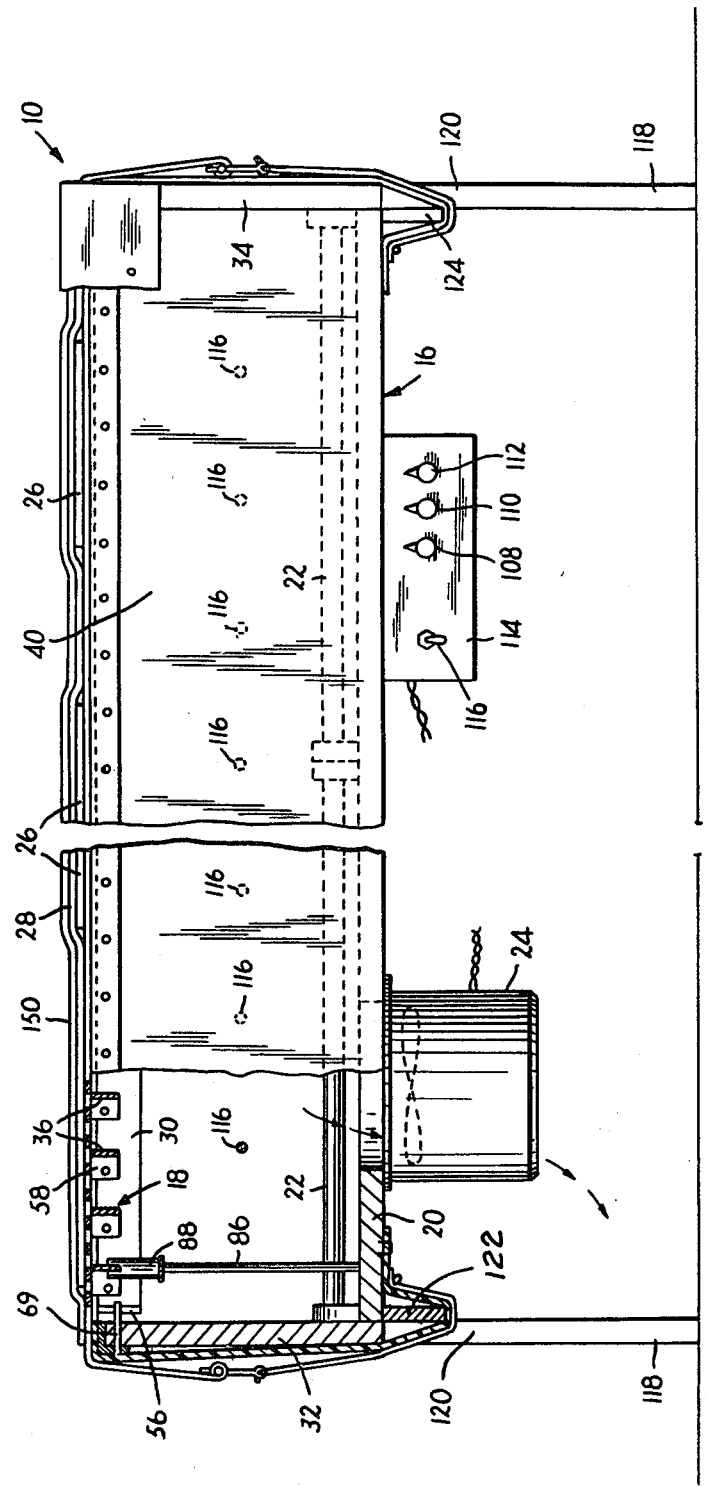

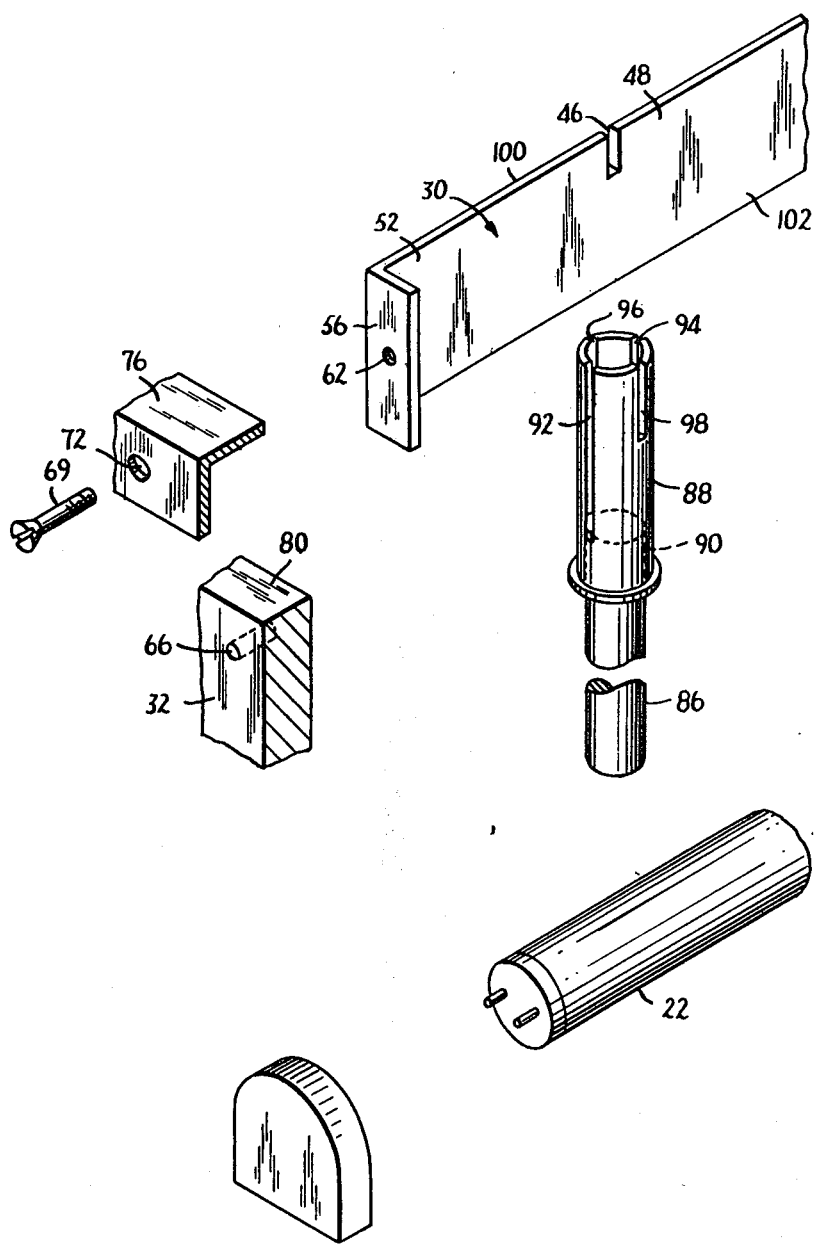
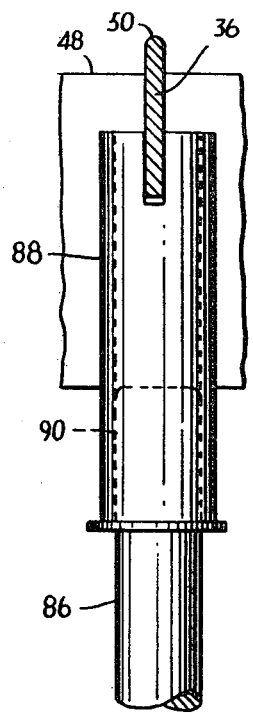

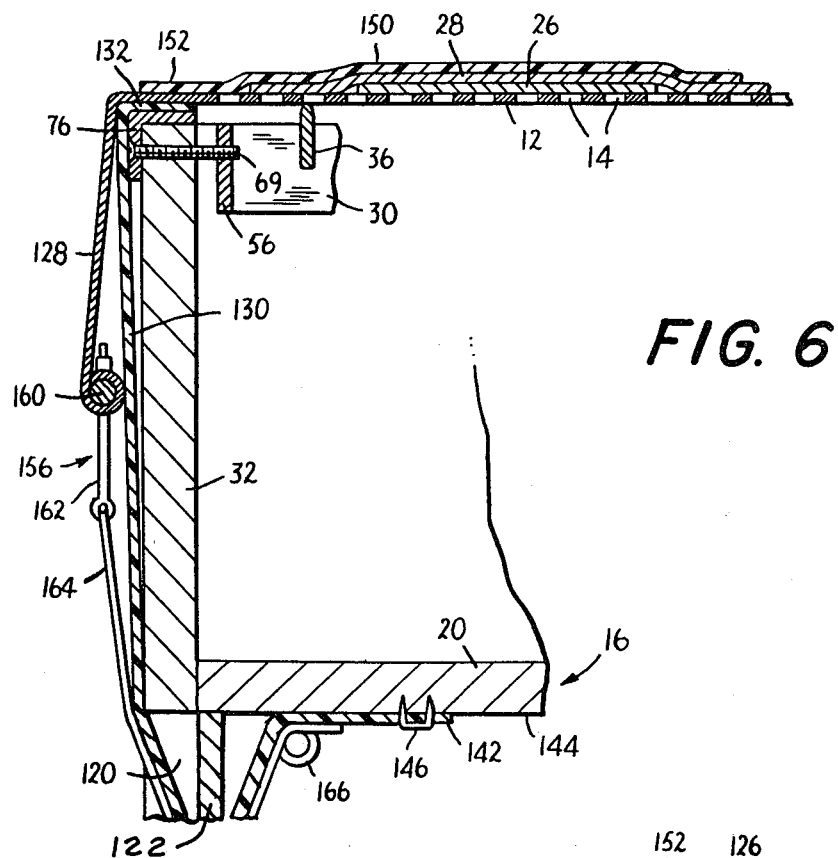
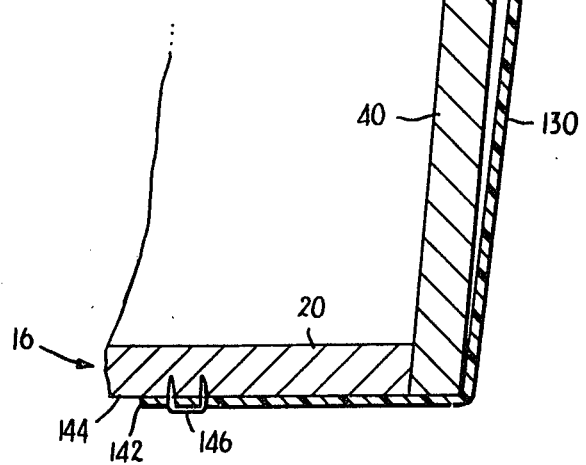
FIG. 6
FIG. 7

PATTERN REPRODUCTION TABLE

This application is a continuation-in-part of my copending U.S. patent application Ser. No. 660,829 filed Feb. 24, 1976 and now abandoned and entitled "PATTERN REPRODUCTION TABLE".

The present invention relates to pattern reproduction tables upon which pattern sections are reproduced upon light sensitive paper. Conventional reproduction tables of this type include a base, which supports a plurality of lamps, and a transparent plate on which pattern pieces are placed and covered with a sheet of light sensitive paper. Perforations are provided in the transparent plate and a vacuum blower mounted on the base provides suction at the perforations to hold the pattern pieces and the light sensitive paper in place. In use, the lamps are illuminated and the image of the patterns is transferred to the light sensitive paper. In such reproduction tables there is a continuing need for a means to support the transparent sheet in a rigid manner, without unduly obstructing the lamps sufficiently to decrease the intensity of the light transmitted to the light sensitive paper, and without interfering with the air flow produced by the vacuum blower.

Reproduction tables of this type, when used in the garment industry for reproducing pattern sections, are normally made of large size, for example from twenty to forty yards in length in order to reproduce a large number of pattern sections at one time. In such tables, the pattern sections and light sensitive paper are placed on a rigid transparent plate, made of plastic or glass, overlying the table base and the lamps therein. The transparent plate is the same size as the table base, and where the table is 20 yards or over in length, the plate is very large and heavy. Thus, strong support means must be provided for the plate, which support means must be so arranged that it does not interfere with the illumination transmitted to the light sensitive paper. Further, plastic or glass plates of this large size are expensive and greatly increase the cost of the finished table.

U.S. Pat. No. 3,446,162 discloses a pattern reproduction table of the aforementioned type having a glass plate upon which the pattern sections and photo-sensitive paper are placed. This glass plate is supported by the light tubes within the table, and a large array of closely spaced, transversely-extending light tubes are required for this purpose.

U.S. Pat. No. 3,512,487 shows a top structure for a pattern reproduction table again having a rigid glass sheet constituting the working surface of the table. Vacuum means are also provided for holding the pattern sections and photosensitive paper flat against the glass sheet.

In U.S. Pat. No. 3,064,525 there is shown a printer sheet assembly table of relatively small size for illuminating transparencies or the like for subsequent photographing to produce printing plates. A rigid transparent plate is again employed as the working surface of the table and is supported by a plurality of upstanding translucent partition walls. U.S. Pat. No. 1,113,263 shows an interior-illuminated drawing board having a top surface made of a glass plate.

In accordance with the present invention, there is provided a pattern reproduction table in which the working surface is formed by a transparent perforated sheet of thin film material supported in stretched condition by a novel grid or grill. The grid is so constructed as to permit the full illumination of the transparent perforated sheet, and also permit a vacuum blower to create a suction at the plurality of perforations in the transparent sheet. The reproduction table, according to the present invention is generally rectangular in shape, having generally extended length. The support grid comprises a plurality of relatively thin longitudinal and transverse members which have interengaging slotted portions and which are assembled on edge to form a grill array. The upper edges of the transverse members support the transparent perforated sheet. The surfaces of the transverse and longitudinal members of the support grid are highly polished for the purpose of providing a high degree of light reflectivity. The support grid is supported by a plurality of vertical supports which extend upward from the base of the pattern reproduction table.

The pattern reproduction table also includes an enclosure which extends upward from the base to the ends of the support grid. The ends of at least the transverse members of the support grid are attached to sides of the enclosure under tension. This tensioning of the members of the support grid serves to add stiffness to the support grid for rigid support of the transparent sheet. The base of the pattern reproduction table supports a plurality of lamps, preferably black light for the purpose of exposing a sheet of light sensitive paper which is placed over a plurality of pattern pieces, which are placed on top of the transparent sheet. The highly reflective surfaces of the support grid permits a maximum amount of light to be transmitted to the light sensitive paper. The rounded upper edge on the transverse members reduces the obstruction presented by the transverse members and limits the images of the transverse members on the light sensitive paper to thin lines which are unobjectionable.

Intermediate portions of the enclosure include a plurality of transverse braces which serve to resist the tension forces imposed on the upper edge of the enclosure by the tensioning of the support grid. In one embodiment of the invention, the transverse braces are mounted high in the table enclosure and which underlie and support the grid. The lower edges of the enclosure are slanted inwardly to afford the maximum leg room and convenience for an operator who stands next to, and some times leans over, the pattern reproduction table while arranging pattern pieces on the perforated transparent sheet.

The base of the pattern reproduction table in addition to supporting a pluraltiy of lamps, which are arranged in at least two banks or groups, also supports a vacuum blower which evacuates the entire enclosure and creates a suction at each of the plurality of perforations in the transparent sheet. The side edges of the transparent perforated sheet are attached to upper portions of the enclosure in a relatively air-tight manner thus minimizing unwanted air leaks and maximizing the suction forces at the plurality of perforations in the transparent sheet. The end portions of the transparent perforated sheet are stretched apart by tensioning means which biases the sheet firmly against the underlying support grid.

The pattern reproduction table also includes a relatively thin flexible plastic sheet which, in use, is placed over the light sensitive paper. This plastic sheet assists the action of the vacuum blower in holding the pattern pieces and the light sensitive paper firmly against the transparent sheet, and thus insures accurate reproduction of the pattern pieces.

It is an object of the present invention to provide a pattern reproduction table having a transparent perforated sheet of thin film material supported by a grid assembly.

Another object of the invention is to provide a pattern reproduction table having a support grid comprising thin longitudinal and transverse members assembled on edge to form a grill array.

Another object of the invention is to provide a grid array having transverse edges rounded and projecting above longitudinal edges with surfaces of the grid array polished to reflect light.

Another object of the invention is to provide a pattern reproduction table in which a grid array is held in tension on the upper portion of an enclosure.

Another object of the invention is to provide a pattern reproduction table which has lamps arranged in banks to enable selective illumination of portions of the table.

Still another object of the invention is to provide a pattern reproduction table which contains relatively few simple parts and is economical in manufacture.

Additional objects and advantages of the invention will become apparent during the course of the following specification, when taken in connection with the accompanying drawing in which:

FIG. 3 is a sectional view taken along the line 3—3 of FIG. 2 with the pattern pieces and the light sensitive paper shown in place;

FIG. 4 is a fragmentary exploded view of a portion of the support grid showing a fragment of a transverse member and a fragment of a longitudinal member, and the end portion of a lamp;

FIG. 5 is an enlarged fragmentary side view of a portion of the support grid showing a support post;

FIG. 6 is an enlarged fragmentary sectional view of the end portion of the pattern reproduction table taken along the line 6—6 of FIG. 2; and FIG. 7 is an enlarged fragmentary sectional view of the side portion of the pattern reproduction table taken along the line 7—7 of FIG. 2.

Figure 1:
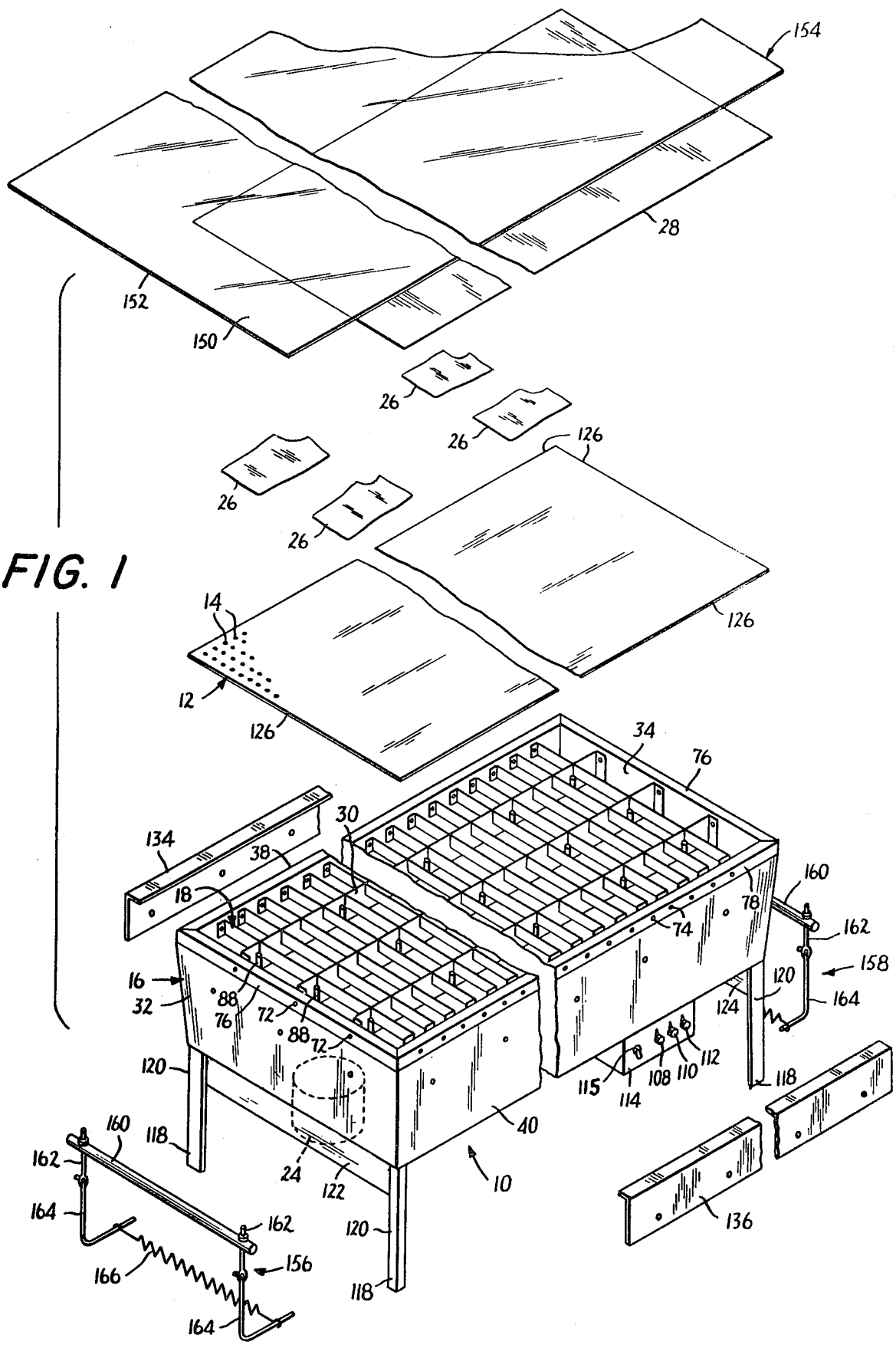
FIG. 1 is an exploded perspective view of a pattern reproduction table according to the present invention showing four pattern pieces in place for reproduction onto a sheet of light sensitive paper.
Figure 2:
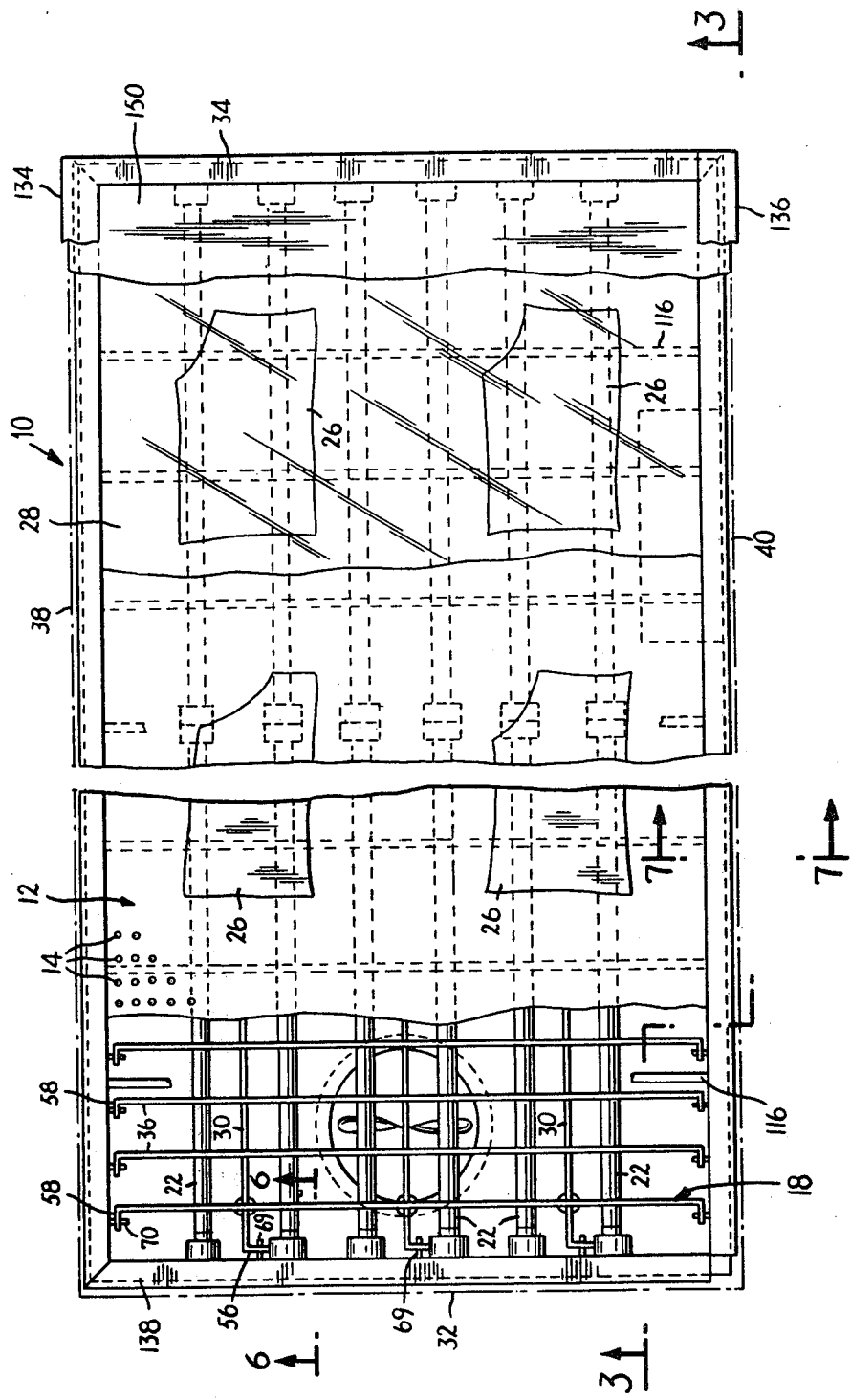
FIG. 2 is a top view of the pattern reproduction table of FIG. 1 with portions of the perforated sheet shown broken away to reveal details of construction.

Referring in detail to the drawings, there is shown in FIG. 1 a preferred embodiment of a pattern reproduction table 10 made in accordance with the present invention. The table 10 comprises a flexible transparent sheet 12 of thin film material having a plurality of perforations 14, which is mounted on an enclosure 16 and is supported by a grid or support grill 18 which is a feature of the present invention. The base 20 of the enclosure 16 supports one or more banks of lamps 22 (FIG. 3), which preferably emit black ultra-violet light, and a vacuum blower 24. The vacuum blower 24, in use, acts to evacuate the enclosure 16 and thereby creates suction forces at each of the plurality of perforations 14 in the overlying transparent sheet 12. The suction forces serve to retain the pattern pieces 26 in place and also to hold a sheet of light sensitive paper 28, which is placed over the pattern pieces 26 as shown in FIG. 1, firmly in place. When the lamps 22 are illuminated, the image of each opaque pattern piece 26 is transferred to the light sensitive paper 28. The light sensitive paper 28 is then removed from the table 10 and developed in a conventional manner to produce a pattern marker.

The support grid 18, which is a novel feature of the present invention, comprises a plurality of longitudinal metallic strips 30 of extended length extending from one end 32 to the opposite end 34 of the enclosure 16, and a plurality of relatively shorter transverse metal strips 36 extending from side 38 to side 40 of the enclosure 16. At each intersection between a longitudinal strip 30 and a transverse strip 36, the transverse strip 36 has a slot 42 extending upward from its lower edge 44 and the longitudinal strip 30 has a slot 46 extending downward from its upper edge 48 as shown typically in FIG. 4. The slots 42 and 46 interengage as shown in FIG. 5 and the resulting support grill 18 is extremely rigid since the slots 42 and 46 prevent rotation of individual strips.

As best seen in FIGS. 4 and 5, the longitudinal strips 30 are of appreciably greater width than the transverse strips 36. As shown in FIG. 5, the upper edges 50 of the transverse strips 36 are rounded, for a purpose to be presently explained.

The end portions 52 and 54 of the longitudinal and transverse strips 30 and 36 are formed with respective bent tabs 56 and 58, each of which has a respective threaded hole 62, 64. These threaded holes 62 in the tabs 56 of longitudinal strips 30 are aligned with clearance holes 66 in the respective ends 32 and 34 of the enclosure 16, while the threaded holes 64 in the tabs 58 of transverse strips 36 are aligned with clearance holes 68 in the respective sides 38 and 40 of the enclosure 16. The upper edges of the enclosure ends 32 and 34 are bordered by respective angle brackets 76 which have apertures 72 registering with clearance holes 66. Similarly, the upper edges of enclosure sides 38 and 40 are bordered by respective angle brackets 78 which have apertures 74 registering which clearance holes 68. Screws 69 and 70 pass through apertures 72 and 74 in angle brackets 76, 78, and the underlying clearance holes 66 and 68, the screws 69 and 70 engaging threaded holes 62 and 64 respectively. Tightening of the screws 69 and 70 places the longitudinal and transverse strips 30 and 36 under tension by drawing the ends of the strips apart. This tensioning of the longitudinal and transverse strips 30, 36 contributes to the rigidity of the support grid 18.

At selected spaced intersections between longitudinal and transverse strips 30, 36, a support post 86 is provided which extends upward from the base 20. One such support post 86 is shown in detail in FIGS. 4 and 5. The support post 86 has a slotted support tube 88 mounted on its upper end 90. The support tube 88 has a pair of opposed, elevated, longitudinal slots 92, 94 which receive the longitudinal strip 30 and a pair of opposed longitudinal shorter slots 96, 98 which receive the transverse strip 36. The slots 92, 94 are of greater length than the slots 96, 98. The support posts 84 provide rigid support for the support grill 18 while also preventing relative motion or rotation between the longitudinal members 30 and the transverse members 36 of the support grill 18.

The slots 42 and 46 in the strips 30 and 36 are of such a length that they maintain the transverse strips 36 slightly elevated relative to the longitudinal strips 30. Thus, the upper edges 50 of the transverse strips 36 project above the upper edges 48 of the interlocked longitudinal strips 30, as shown in FIG. 5, and serve as the sole supports for the overlying perforated transparent sheet 12.

The longitudinal and transverse strips 30, 36 of the support grill 18 are both relatively thin and surfaces 100, 102, 104 and 106 of these strips are highly polished or alternatively, coated with a highly reflective coating. The thinness of the strips 30, 36 and the high degree of reflectivity of their surfaces 100, 102, 104 and 106 prevents the support grill 18 from obscuring or absorbing any significant amount of light from the lamps 22. In addition, the rounded upper edge 50 of the transverse strips 36 permits light to spill over the upper edge 50 and onto the transparent perforated sheet 12. This results in the images of the transverse strips 36 transferred to the light sensitive paper 28 being thin lines limited in thickness to the width of the line contact of the transparent sheet 12 and the upper edges 50 of the transverse strips 36. These thin lines in no way detract from the utility of the pattern marker produced by the pattern reproduction table 10. The support grill 18 which is visible through the transparent sheet 12, when the pattern reproduction table 10 is in use, has the added advantage of aiding in the alignment and the arrangement of the pattern pieces 26. The support grid 18, according to the present invention, thus provides a structure which is both light in weight and simple in manufacture yet extremely stiff and which presents almost no obstruction to the passage of light from the lamps 22 onto air which is moved by the vacuum blower 24.

The plurality of lamps 22 supported by the base 20 are electrically connected in three banks each independently controlled by one of three timers 108, 110, 112 mounted on a control panel 114. This feature makes possible the economical use of the pattern reproduction table 10 according to the present invention for the reproducing of a group of pattern pieces which is smaller in size than the entire table, since only enough lamps 22 to illuminate the pattern pieces need be energized. The timers 108, 110 and 112 are set to energize the lamps 22 for a predetermined exposure in accordance with the requirements of the light sensitive paper 28. The control panel 114 also includes a switch 115 for the control of the vacuum blower 24.

Also mounted within the enclosure 16 are a plurality of relatively slender rods 116, extending between the sides 38 and 40 of the enclosure. The rods 116 resist the forces created by the tensioning of the support grill 18, which forces tend to bring the sides 38 and 40 together. In addition, the upper portions 118 of the legs 120 which support the enclosure 16 are connected by braces 122, 124 which also resist the forces created by the tensioning of the support grid 18. The enclosure 16 also rests on the braces 122, 124.

The sides 38 and 40 of the enclosure 16 slant inwardly from their top edges to their lower edges as shown in FIGS. 1 and 7. This provides increased leg room and comfort for an operator who, during the operation of arranging pattern pieces on the transparent sheet 12, stands next to and often leans over the sides of the pattern reproduction table 10.

The transparent perforated sheet 12, which is supported by the support grid 18, is appreciably longer than the length of the enclosure 16 and is slightly wider than the width of said enclosure. In its mounted position, the marginal side edges 126 of the perforated sheet 12 overlap the side angle brackets 78 of the enclosure, as shown in FIG. 7. The end portions 128 of perforated sheet 12 extend around the end upper corners of the table to an intermediate position on the ends 32 and 34 of the enclosure 16, as shown in FIG. 6, and are held in stretched condition by tensioning assemblies 156 and 158, in a manner to be presently described. The transparent perforated sheet 12 is preferably made of a relatively thin plastic film having requisite strength characteristics, such as Mylar.

The sides and ends of the enclosure 16 are encased by a skirt of vinyl plastic film 130 which has an upper marginal edge 132 overlapping the angle brackets 76 and 78 at the ends and sides of the enclosure 16, and underlying the end portions 132 of the vinyl skirt 130 and the edge portions 126 of the perforated sheet 12 are clamped firmly in mounted position by angle brackets 134 and 136 which extend the length of the table at opposite sides thereof, and are fastened to the upper edges of the enclosure 16. The film skirt 130 extends along the entire side and end walls of the enclosure 16 to the bottom wall thereof, and the lower edge 142 of the skirt 130 is fastened to the bottom surface 144 of the base 20 by means of staples 146, as shown in FIGS. 6 and 7. The film skirt 130 forms an air-tight seal around the side and end walls of the enclosure 16 and prevents unwanted leakage of air into the enclosure, thus increasing the efficiency of the vacuum blower 24. The angle brackets 134, 136 are clamped to the sides 38 and 40 of the enclosure 16 by means of a plurality of screws 148. A similar pair of angle brackets may optionally be employed at the ends of the table to clamp down the end portions of the perforated sheet 12 and vinyl skirt 130, although such end angle brackets are not necessary since the ends of the perforated sheet 12 are stretched and tensioned by the tensioning assemblies 156 and 158, and depress the underlying marginal end edges 132 of the vinyl skirt therebeneath, to provide a top seal therefor.

The angle brackets 134 and 136 at the sides of the table may also serve as tracks for a carriage (not shown), which may be employed to roll or slide guided by the angle brackets 134 and 136 for the purpose of dispensing light sensitive paper from a roll carried by the carriage.

The pattern reproduction table 10 further includes a top sheet 150 of a relatively thin plastic film. The top sheet 150 is placed over the light sensitive paper 28 and serves to block those perforations 14 in the transparent perforated sheet 12 which are not blocked by the light sensitive paper 28, thus increasing the effectiveness of the vacuum blower 24 in evacuating the enclosure 16. The top sheet 150 is of such size that its marginal side edges 152 overlap the side walls 38 and 40 of the enclosure 16, as shown in FIG. 7, while its marginal end edges overlap the tops of the end walls 32 and 34 of the enclosure 16, as shown in FIG. 6.

Each of the tensioning assemblies 156 and 158 comprises a rod 160 around which is looped and fastened a respective portion 128 of the perforated sheet 12. A pair of eye bolts 162 are mounted at each end of the rod 160, to which lengths of cords 164 are connected. The cords 164 are looped around legs 120 of the enclosure 16 and are connected together by coil springs 166 which maintain tension on the cords 164 and thus upon the rods 160 carried thereby. The tensioning assemblies 156 and 158 thus serve to stretch the perforated Mylar sheet 12 in a longitudinal direction and bias the sheet firmly upon the underlying support grid 18, preventing sagging or buckling of the long, flexible, perforated sheet 12. The top sheet 150 supplements the function of the vacuum blower 24 in overlying and covering up the otherwise exposed perforations of the sheet 12 and holding the pattern pieces 26 and the light sensitive paper 28 firmly in mounted position upon the perforated sheet 12.

In operation of the pattern reproduction table 10, the vacuum blower 24 is set in operation and the pattern pieces 26 are laid out in a selected arrangement on the upper surface of the perforated transparent sheet 12, being held in position by the vacuum created within the enclosure 16. A length of light sensitive paper 28 is then laid over the pattern pieces 26 and is held in position firmly against the pattern pieces by the air pressure through the perforations 14 in sheet 12. The top sheet 150 is then laid over the sheet of light sensitive paper 28 and is held firmly thereagainst by suction through the perforations of sheet 12. One or more of the timers 108, 110, and 112 are now actuated to illuminate the bank or banks of lamps 22 immediately beneath the length of light sensitive paper 28 so as to illuminate the pattern pieces 26 therebeneath and expose the light sensitive paper to the outline of these pattern pieces. At the end of the selected exposure, the top sheet 150 is removed, the vacuum blower 24 is deenergized, and the light sensitive paper 28 is removed for development.

The perforated transparent sheet 12, as previously indicated, is made of a thin film material, such as transparent Mylar sheet, which is flexible and of light weight. When initially mounted on the top of the table and stretched longitudinally by the tensioning assemblies 156 and 158, the sheet 12 is maintained taut and rests in flat planar form upon the rounded upper edges 50 of the transverse strips 36 of support grid 18. FIGS. 3 and 6 show the sheet 12 resting in this flat, planar condition on the support grid. In certain instances, use of the tensioning assemblies 156 and 158 may be eliminated, and the sheet 12 may be mounted in this stretched, flat condition by manually stretching out the sheet 12 and then securing its edges to the table by means of strips of adhesive tape, or the like.

Figure 10:
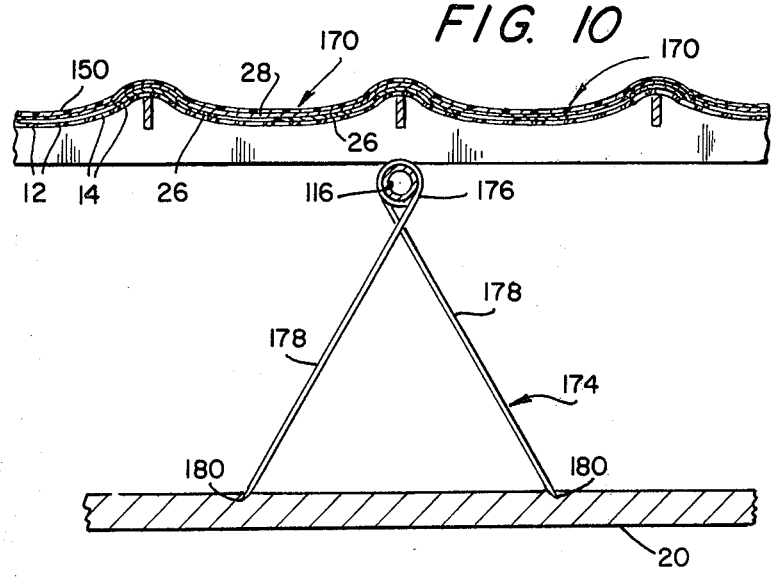
FIG. 10 is a sectional view, on a smaller scale, corresponding to FIG. 9, and also showing the manner in which the transparent carrier sheet is supported by the grill of the table.
Figure 9:
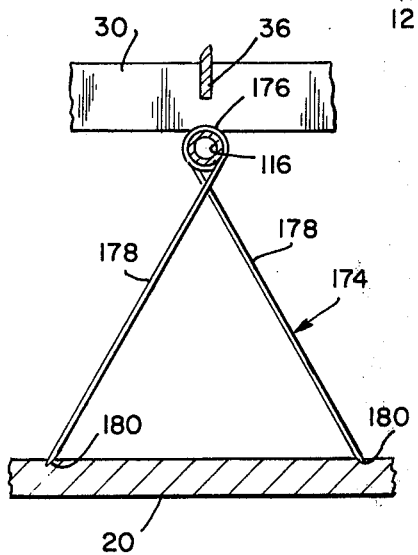
FIG. 9 is a fragmentary section taken along line 9—9 of FIG. 8.
Figure 11:
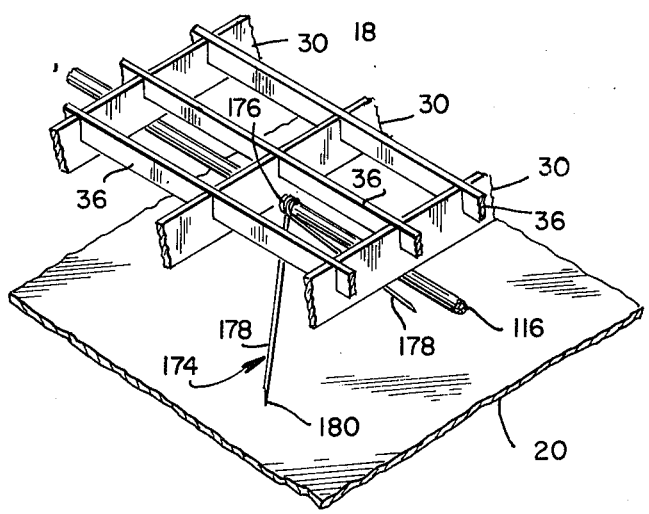
FIG. 11 is a fragmentary perspective view of the grid supporting structure shown in FIGS. 8–10.

It will be understood that since the table 10 is made appreciably long, preferably of a length between 20 and 40 yards, and the sheet 12 is made of corresponding length and of thin, flexible film material, the long sheet 12 will sag to a certain degree when the vacuum created within the table is applied thereto. Thus, when the pattern pieces 26, light sensitive paper 28, and top sheet 150 are placed flat upon the stretched perforated sheet 12, and a vacuum condition is created within the table enclosure 16, the thin film sheet 12 will be drawn downwardly slightly between each pair of adjacent transverse strips 36, so that the sheet 12 assumes the wavy or sinuous shape shown in FIG. 10, the overlying pattern pieces, light sensitive paper and top sheet also assuming this configuration. While undulations 170, in the form of shallow curves, are formed in the sheet 12, it will be seen that the pattern pieces 26 and light sensitive paper 28 remain flush with the surface of the sinuous sheet 12 so that the photographic reproduction of the pattern pieces is not adversely affected.

In the modified embodiment shown in FIGS. 8 through 11, the support posts 86 are eliminated, and the grid 18 is supported by a more simplified structure. In this embodiment, the transverse rods 116, instead of being centrally mounted as in the previous embodiment, are mounted at a higher level within the enclosure 16 of the table 10, and between the side walls 38 and 40 thereof. As previously described, the rods 116 resist the forces, created by the tensioning of the support grill 18, which tend to draw together the side walls 38 and 40.

Figure 8:
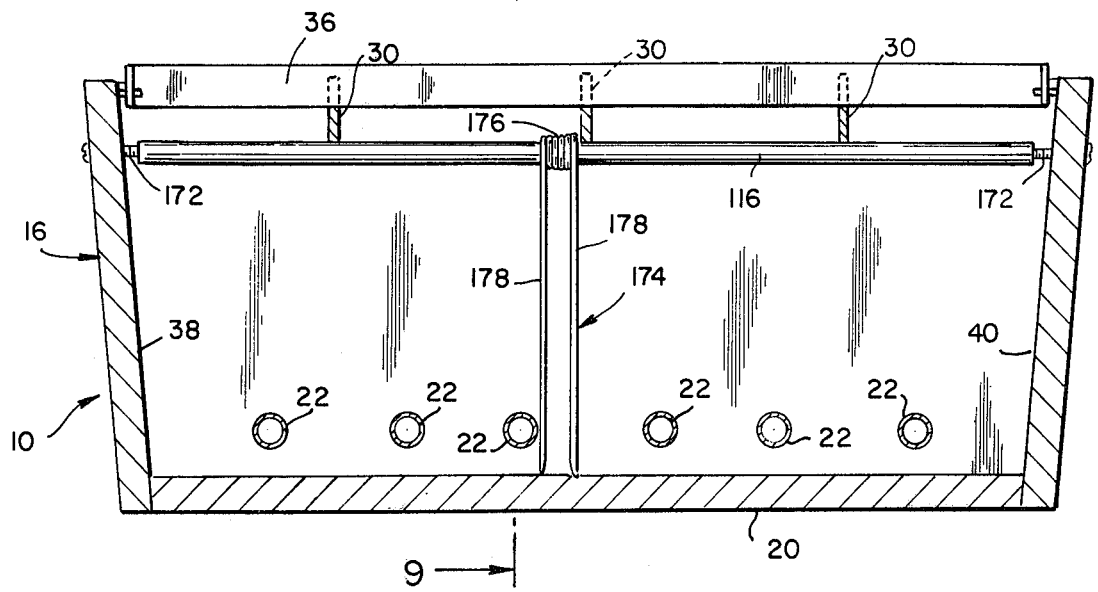
FIG. 8 is a transverse section through a pattern cutting table made in accordance with the present invention, and incorporating a modified structure for supporting the grid.

The level of the mounted rods 116 is so selected that the longitudinal strips 30 of the grid 18 rest upon said rods, as shown in FIG. 8, so that the rods 116 provide the support for the grid 18. The rods 116 are secured within the table enclosure 16 by screws 172 which extend through the side walls 38 and 40 and are tightened to draw said side walls together. Each of the rods 116 is also supported at its center, and prevented from sagging under the weight of the grid 18, by a supporting member 174. Each of the supporting members 174 is made of a length of strong and relatively rigid metal wire bent at its center to form a plurality of circular loops 176 with elongated legs 178 depending therefrom. The legs 178 are formed with sharpened points 180 at the free ends thereof.

The loops 176 are sized to permit a rod 116 to be inserted therethrough with the loops closely embracing the rod 116 approximately at the center thereof. The legs 178 are now spread apart manually in the manner shown in FIGS. 9 and 10, the loops 176 providing such flexibility to the supporting member 174 that the spread-apart legs are biased inwardly toward each other. The legs 178 are made sufficiently long so that they extend from the rod 116 to the bottom wall to the top of the table. The pointed ends 180 of the spread-apart legs 178 are pressed into the wooden bottom wall 20 so that they become embedded in the latter. The spring force, urging the legs 178 toward each other, maintains the legs firmly embedded in the bottom wall of the table so that the supporting member 174 provides a rigid support for the rod 116 which in turn supports the grid 18.

While preferred embodiments of the invention have been shown and described herein, it is obvious that numerous additions, changes and omissions may be made in such embodiments without departing from the spirit and scope of the invention.

What is claimed is:

1. A pattern reproduction table comprising an enclosure having a top open end, thin metal highly light reflecting crisscross shaped grid means mounted across the said top open end of said enclosure and spaced above the lower end thereof, a flexible transparent air-permeable sheet of thin film material overlying said grid means and initially supported thereby by upper surfaces of said grid means which extend in a first direction, vacuum blower means communicating with said enclosure for exhausting air therefrom to create a suction through said air-permeable sheet, and a plurality of lamps mounted in said enclosure at the lower end thereof beneath said grid means, and spaced a substantial distance below said grid means, said flexible transparent sheet being drawn downwardly through openings in said grid means under the suction created by said vacuum blower means so as to engage the upper surfaces of all of said grid means which extend in said first direction and form downwardly bowed undulations therebetween, thereby presenting a sinuous shape in cross-section.

2. A pattern reproduction table according to claim 1 in which said grid means comprises a plurality of thin metal strips extending longitudinally of said enclosure and arranged substantially parallel to each other and closely-spaced from each other, and a plurality of thin metal strips extending transversely of said enclosure and arranged substantially parallel to each other and closely spaced from each other, said longitudinal and transverse strips being disposed in planes substantially perpendicular to the plane of said air-permeable sheet and having interengaging slotted portions, at least some of said strips having upper supporting surfaces adapted to engage the lower surface of said air-permeable sheet with a minimum area of contact.

3. A pattern reproduction table according to claim 2 in which said transverse strips have relatively thin upper edges contacting the lower surface of said air-permeable sheet.

4. A pattern reproduction table according to claim 2 which includes means for maintaining said grid under tension.

5. A pattern reproduction table according to claim 2 which includes means for maintaining said air-permeable sheet under tension upon said grid means with minimum blockage of the light from said lamps.

6. A pattern reproduction table according to claim 2 in which said transverse strips have an upper edge projecting above an upper edge of said longitudinal strips, said transparent perforated sheet resting only on said upper edges of said transverse strips.

7. A pattern reproduction table according to claim 6 in which said upper edges of said transverse strips are convex.

8. A pattern reproduction table according to claim 6 in which a plurality of upstanding support posts support said grid within said enclosure, each of said support posts having a top support tube provided with opposed pairs of longitudinal slots receiving the lower ends of one longitudinal strip and one transverse strip at the intersection of said strips.

9. A pattern reproduction table according to claim 2 in which surfaces of said grid means are opaque and in which said metal strips have surfaces which are highly reflective to light.

10. A pattern reproduction table according to claim 1 in which said enclosure comprises a pair of opposed longitudinal side walls and a pair of opposed transverse end walls, and in which said grid means is secured to at least one of said pairs of walls by tension means.

11. A pattern reproduction table according to claim 10 which further comprises a plurality of rigid members mounted between said longitudinal side walls of said enclosure for resisting forces imposed on said enclosure resulting from tensioning of said grid means by said tension means.

12. A pattern reproduction table according to claim 11 in which said grid means rests upon and is supported by said rigid members, and in which each of said rigid members is supported by a supporting member comprising a plurality of loops extending around said rigid member and terminating in supporting legs engaging the bottom wall of said enclosure.

13. A pattern reproduction table according to claim 1 in which said air permeable sheet is a transparent perforated sheet of greater length than the length of the top open end of said enclosure, said table also including means attached to the ends of said perforated sheet and holding said sheet in stretched condition upon said grid before said vacuum means is operated.

14. A pattern reproduction table according to claim 1 which also includes a top film sheet sized to overlie a major portion of said air permeable sheet.

* * * * *